UNITED STATES PATENT OFFICE.

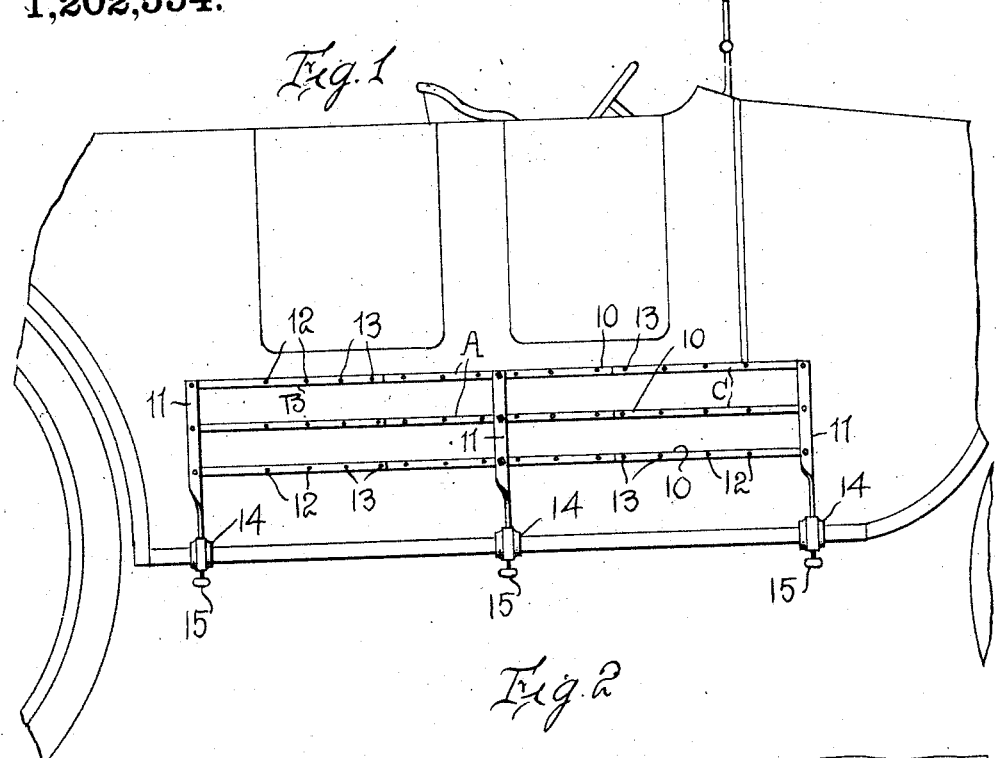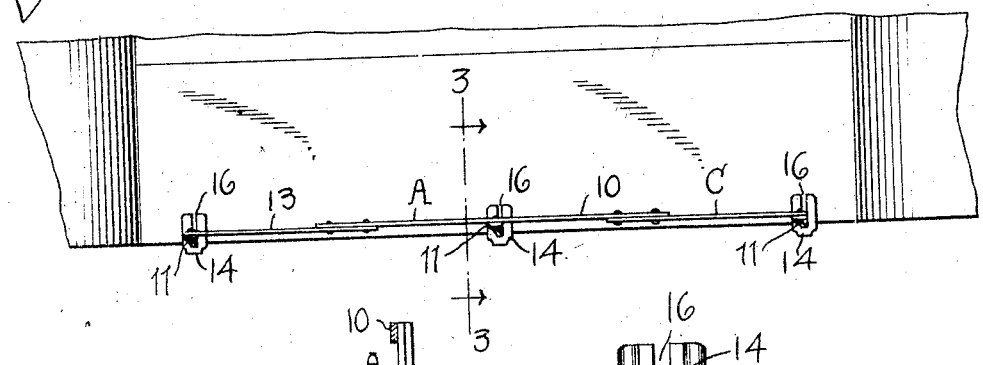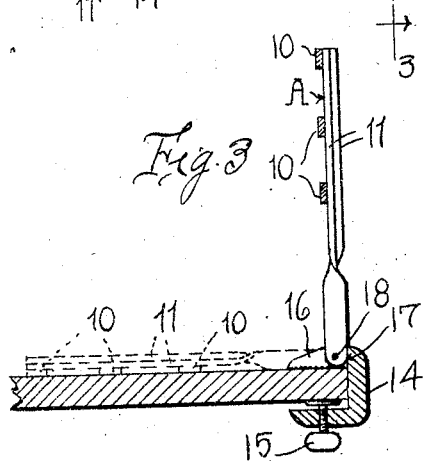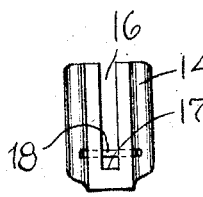

WILLIAM MARQUETTE, OF ATLANTIC, IOWA.

LUGGAGE-CARRIER FOR AUTOMOBILES.

1,202,554.

Specification of Letters Patent.  Patented Oct. 24, 1916.

Application filed April 8, 1916. Serial No. 89,898.

*To all whom it may concern:*

Be it known that I, WILLIAM MARQUETTE, a citizen of the United States, residing at Atlantic, in the county of Cass and State of Iowa, have invented certain new and useful Improvements in Luggage-Carriers for Automobiles, of which the following is a specification, reference being had to the accompanying drawings.

This invention relates to luggage carriers, and particularly to improvements on the folding luggage carriers which form the subject-matter of my Patent No. 1,095,339, granted May 5, 1914.

The object of my present invention is to improve upon the construction disclosed in said prior patent by the provision of means whereby the luggage carrier may be detachably clamped upon the running board of an automobile instead of being bolted thereto, thereby permitting the luggage carrier to be readily removed from the running board or replaced thereon and making it much more convenient in every way.

A further object is to provide clamping means for the carrier which may be readily engaged with or disengaged from the running board of the automobile, which will permit the luggage carrier to be folded down into a position against the upper face of the running board, or which will permit the luggage carrier to be turned out at right angles to the running board and will resist any further outward movement of the carrier so that the latter will be held in a vertical position against the pressure of the luggage disposed between the running board and between the carrier and the body of the automobile.

The invention is illustrated in the accompanying drawings, wherein:

Figure 1 is a fragmentary side elevation of an automobile showing my luggage carrier applied to the running board thereof; Fig. 2 is a fragmentary top plan view of the construction shown in Fig. 1; Fig. 3 is a fragmentary sectional view of the running board with my carrier applied thereto; and Fig. 4 is a top plan view of one of the clamps 14.

Referring to these drawings, it will be seen that my carrier consists of a frame, as it may be termed, comprising a plurality of longitudinally extending bars, designated 10, and a plurality of transversely extending bars 11 to which the bars 10 are riveted or otherwise firmly attached. Preferably, the bars 10 are riveted to the end members 11 but bolted to the intermediate member 11. Inasmuch as automobiles vary as regards the length of the running boards, each of the bars 10 is made in two or more sections. I have illustrated the bars 10 as being made in three sections A, B and C. The section A overlaps the sections B and C at its extremities, and the bars 10 of the sections A, B and C are provided with perforations 12 whereby bolts 13 may be disposed through the perforations to thereby connect the sections rigidly to each other. By this means the length of the luggage carrier may be adjusted not only so as to suit various lengths of running board, but also so as to make the luggage carrier larger or smaller, as may be desired, if a small amount or a large amount of luggage is to be carried. If a small amount of luggage is to be carried it is obvious that one set of sections may be left off entirely. Thus, for instance, the sections A may be left off and the sections B and C connected to each other to make a relatively short luggage carrier.

The transverse bars 11, which I will hereafter call "standards", are twisted where they extend beyond the innermost set of bars 10 so that the inner ends of the standards lie in planes at right angles to the outer portions of the standards. For the purpose of hingedly supporting the standards upon the foot-board of an automobile, I provide for each standard a substantially U-shaped clamping member 14 having an upper and a lower arm, and through the lower arm extends a set screw 15 having preferably a wide foot which bears against the under side of the foot-board. The upper arm of each standard is longitudinally slotted, as at 16, and the inner end of this slot is defined by an upwardly extending shoulder 17. The walls of this slot more or less adjacent the shoulder 17 are provided with bolt holes through which passes the bolt 18 which passes through the adjacent end of the corresponding standard 11 so that the standard is thus pivotally secured or hinged to the clamp.

It is obvious that with this construction the frame composed of the members 10 and 11 can be turned down into a horizontal position parallel to and resting upon the running board or that it may be turned up to a vertical position and that in this position the edge of each standard will bear against the end walls 17 and the standard will thus be held in a vertical position. It is also obvious that the construction as a whole may be readily taken apart, folded into compact shape, and that the clamps may be readily detached from the rack or frame and that the device is adjustable to suit different exigencies of operation. In my old construction the luggage carrier had to be bolted to the running board and this requirement not only defaced the running board but also rendered it inconvenient to apply or remove the luggage carrier. My present construction permits the luggage carrier to be applied to running boards of metal as well as to wooden running boards and without defacement. It can therefore be applied to hired or borrowed automobiles as well as to one's own private car, and can be, as before stated, readily adjusted to any length of running board or to any circumstance of operation.

Having described the invention, what I claim is:—

A luggage carrier for automobiles including a rack having a plurality of transverse bars forming standards, a plurality of clamps each U-shaped in form to provide opposed jaws, the upper jaw of each clamp having a longitudinally extending slot extending to the end of the corresponding clamping jaw, the extremities of the standards being disposed in said slots and pivoted to the respective clamps, the end wall of each slot forming a stop limiting the movement of the corresponding standard in that direction.

In testimony whereof I hereunto affix my signature in the presence of two witnesses.

WILLIAM MARQUETTE.

Witnesses:
 H. G. DACKELL,
 S. H. RUDOLPH.